United States Patent [19]

Edwards

[11] Patent Number: 4,602,201

[45] Date of Patent: Jul. 22, 1986

[54] PWM MOTOR DRIVE WITH TORQUE DETERMINATION

[75] Inventor: Charles W. Edwards, Monroeville, Pa.

[73] Assignee: Westinghouse Electric Corp., Pittsburgh, Pa.

[21] Appl. No.: 786,163

[22] Filed: Oct. 9, 1985

Related U.S. Application Data

[63] Continuation of Ser. No. 617,448, Jun. 5, 1984.

[51] Int. Cl.[4] ............................................. H02D 5/40
[52] U.S. Cl. ..................................... 318/811; 318/798; 318/806
[58] Field of Search ............................................. 363/37

[56]  References Cited

U.S. PATENT DOCUMENTS 4,158,163  6/1979  Eriksen et al. ...................... 318/798
4,521,840  6/1985  Hoadley .............................. 363/37

Primary Examiner—David Smith, Jr.
Attorney, Agent, or Firm—C. M. Lorin

[57]  ABSTRACT

A pulse-width-modulated motor drive includes means for the derivation of a signal representative of the torque by sensing the DC-link current directly, or indirectly, and by dividing the sensed signal by the modulation index of the motor drive to obtain proportionality through the duty-cycle long range succession.

2 Claims, 9 Drawing Figures

PWM MOTOR DRIVE WITH TORQUE DETERMINATION

This application is a continuation of application Ser. No. 617,448, filed June 5, 1984.

BACKGROUND OF THE INVENTION

The invention relates to torque determination in AC motor drives in general, and more particularly in variable-frequency, variable-speed motor drive systems. The determination of the torque is important in AC motor drives, since the torque is an essential control parameter of an electrical motor drive. Constant torque motor drive operations under variable speed is one field of application of the invention. Another application is in motor drives operating at constant speed but variable torque. In the latter instance the function of the torque as a detected parameter is to allow detection of a torque limit characteristic of an overload requiring immediate corrective action on the motor drive. This is the case, for instance, where the AC motor drives a bottle conveyor. The excessive torque is indicative of a malfunction requiring to stop the conveyor.

In static-controller AC motor drives including a voltage-fed inverter for the generation of controlled AC current to the introduction motor, there is a DC link providing DC link current at the input terminals of the inverter. The product of the DC link voltage by the average of the DC link current is equal to the power delivered to the motor, that is: Power=Voltage×Current. On the other hand, Power=Speed×Torque, thus, Torque=(Voltage×Current)/Speed However, in an AC motor drive of the AVI type, i.e., DC link voltage adjusted motor drive, the DC voltage is automatically adjusted so that the voltage stays proportional to the frequency within the normal range of operation, thereby to keep the air-gap flux voltage drop constant. As a result, the torque will be proportional to the DC-link current in this type of motor drive. Sensing the DC-link current will be providing a signal representative of the torque. As an example of a GTO-controlled inverter associated with a three-phase thyristor-controlled AC/DC converter and operating as a DC/AC adjustable-frequency inverter, see D. A. Paice and K. E. Mattern "Application of Gate-Turn-Off Thyristors" in 1982 IEEE (IAS 82:27E) pp. 663–669.

This is no longer the case with a pulse-width modulated AC motor drive. Here, voltage control is performed by modulating the duty-cycle of the inverter-switches, i.e., changing the width of the pulses which determines the active periods of conduction of the switches within the duty-cycle. As an example of a pulse-width modulator for an inverter-fed drive system, see: B. K. Bose and H. A. Sutherland "A High-Performance Pulse-Width Modulator for an Inverter-Fed Drive System Using a Microcomputer" in 1982 IEEE (IAS 82:33A) pp. 847–853. The product of the DC-link voltage by the average DC-link current is still equal to the power being delivered to the motor, ignoring inverter losses. However, while the DC-link voltage is constant, the average DC-link current is here proportional to the motor torque only when the modulation index (i.e. the ratio of the actual motor voltage to the maximum voltage capability of the inverter) is ONE. In other words, the motor torque is proportional to the inverter input current divided by the modulation index. If information relative to the torque is to be derived from the information obtained with the inverter input current, this appears to involve a function which is rather complex and which must be expensive to implement.

SUMMARY OF THE INVENTION

The invention resides in the derivation of a torque representative signal in a pulse-width-modulated AC motor drive. Such derivation is to be implemented by a simple technique performing the function characterizing the inverter input converter, i.e. involving the modulation index.

According to the present invention, a DC-link current representative voltage signal is derived and applied to an operational amplifier so as to generate a feedback current representative of the inverter input current and such feedback current is pulse-width modulated with the aid of a switch, thereby to automatically eliminate the modulation index from the operational amplifier and generate a signal proportional to the inverter input current without modulation, e.g. representative of the torque of the motor like in an adjustable frequency motor drive.

DETAILED DESCRIPTION OF THE INVENTION

Figure 1:
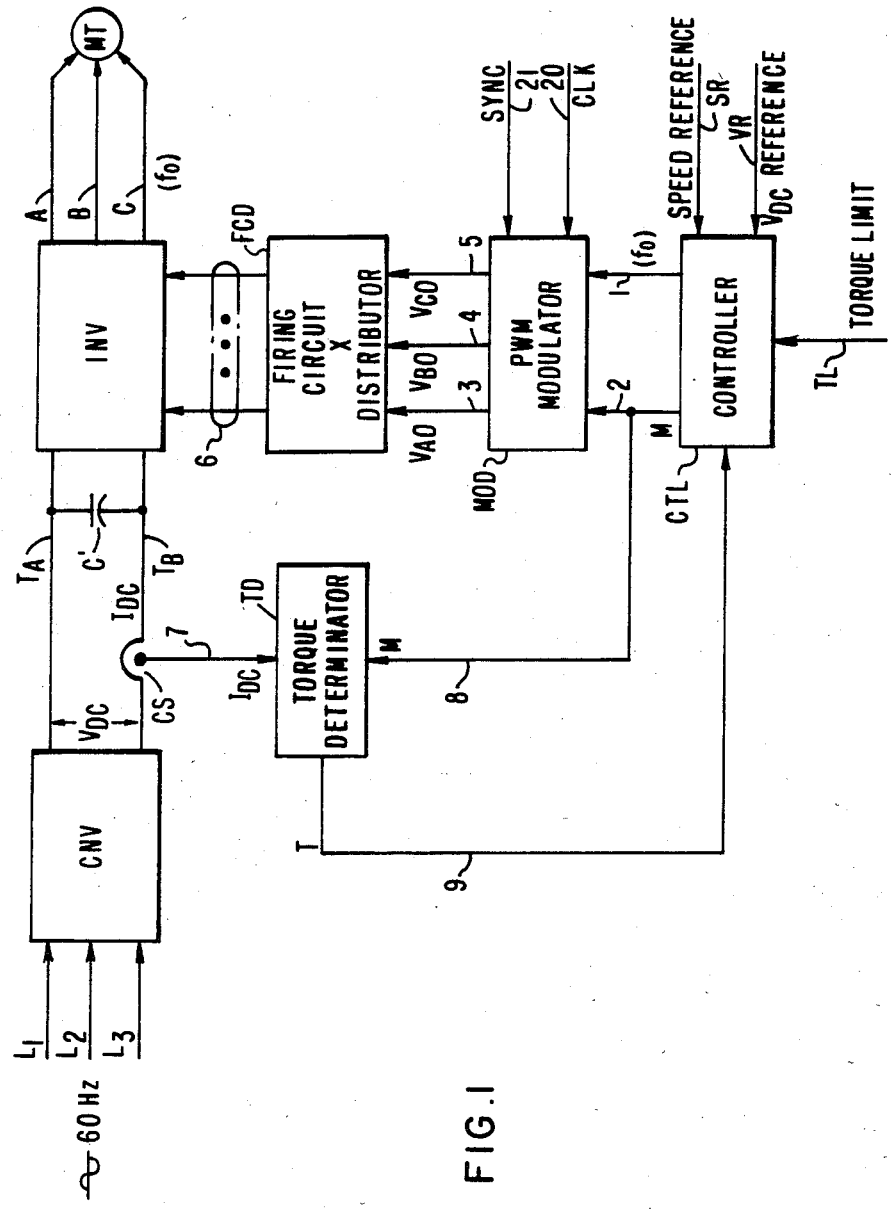
FIG. 1 is a simplified diagram of a torque-controlled PWM motor drive according to the invention.

Referring to FIG. 1, the three-phase industrial power supply lines $L_1$ $L_2$ $L_3$ at 60 Hz are inputted into an AC/DC converter providing, between positive-polarity and negative-polarity terminals ($T_A$, $T_B$), a DC voltage applied to an inverter INV generating AC current to an AC motor M on phases A, B and C. Then motor M is part of a motor drive including a controller CTL responsive to a speed reference SR, a voltage reference $V_R$ for applying to a pulse-width modulation MOD, via line 2, an index of modulation M with a fundamental frequency $f_0$ imposed by line 1 to the output wave of the inverter on phases A, B, C. Accordingly, pulse-width modulated waves, of voltage $V_{AO}$, $V_{BO}$, $V_{CO}$ between phase and ground, are generated by circuit MOD on lines 3, 4, 5 which are applied to a firing circuit and distribution circuit (FCD) controlling by lines 6 the active period of conduction of the sequentially fired static switches of the inverter. This aspect of the circuit of FIG. 1 is well known.

According to the present invention, a current sensor CS senses the magnitude of the DC current $I_{DC}$ in the DC link. A torque determinator responsive to the sensed value of $I_{DC}$ derived on line 7 and to the modulation index M derived from line 2 on line 8, generates on line 9 a signal representative of the torque T as explained hereinafter. The torque representative signal is applied by line 9 to the controller CTL, for instance in order to limit the speed of the motor drive whenever T exceeds a torque limit TL imposed to the controller.

Figure 2:
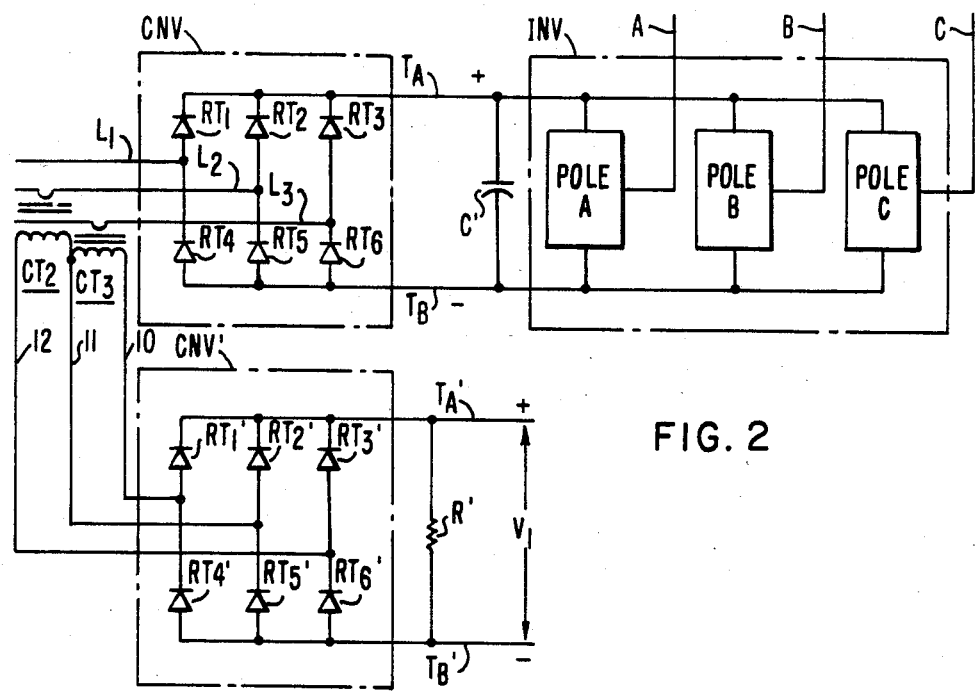
FIG. 2 is the preferred embodiment for the derivation of a DC-link current representative signal.

Referring to FIG. 2, the derivation of a signal truly proportional to the DC-link current $I_{DC}$ is, according to the preferred embodiment, accomplished with the provision of an auxiliary converter CNV' converting to a DC voltage $V_1$ the AC currents flowing into two phases ($L_2$, $L_3$) of the AC input ($L_1$, $L_2$, $L_3$),) and derived from two current transformers $CT_2$, $CT_3$ connected in an open-delta fashion. It appears that while the three line current vectors $I_1$, $I_2$, $I_3$ are spaced at 120 degrees to one another in a symmetrical arrangement, converter CNV provides with the open-delta transformers $CT_2$ and $CT_3$ a voltage signal representing the vector sum of the three current vectors projected on a line which is orthogonal to the third vector $I_1$ and, therefore, such sum is representative at all times of the active current $I_{DC}$ outputted by converter CNV between terminals $T_A$, $T_B$.

FIG. 2 shows the six rectifiers $RT_1$–$RT_6$ of converter CNV and the six rectifiers $RT_1'$–$RT_6'$ of converter CNV'.

Between terminals $T_A'$, $T_B'$ of converter CNV' a parallel resistance R' is provided to establish the average voltage $V_1$ which, between terminals $T_A'$ and $T_B'$, represents current $I_{DC}$. The DC-link, under contant voltage $V_{DC}$ (applied, as well known in a voltage-source, between the two ends of a parallel capacitor C') which is the input of the inverter INV. Inverter INV typically includes three poles: Pole A, Pole B and Pole C which deliver current to motor M over lines A, B and C, respectively.

Figure 3:
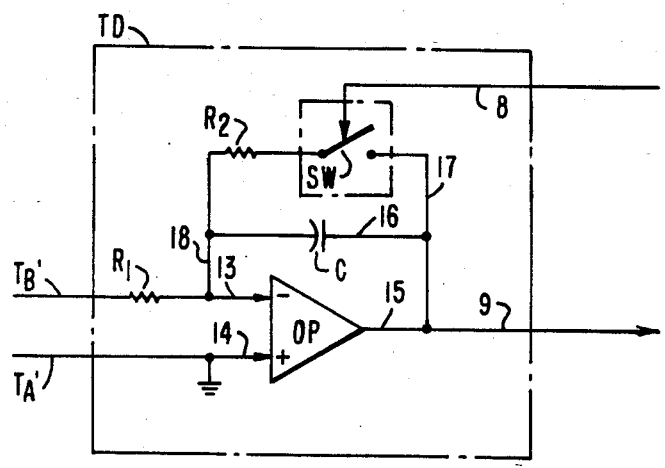
FIG. 3 shows basic circuitry torque determination in accordance with FIG. 1.

Referring to FIG. 3, internal implementation of the torque determinator circuit TD of FIG. 1 is shown in detail. Terminal $T_B'$ of converter CNV' is applied, via a resistor $R_1$ and line 13, to the inverting input of an operational amplifier OP having its non-inverting input connected to ground and to line 14 from terminal $T_A'$ of converter CNV'. The output 15 of the operational amplifier OP is connected, via line 16, to one end of a feedback capacitor C, the other end thereof being connected by line 18 to line 13 and the non-inverting input. A parallel feedback loop from lines 15 and 17 goes to lines 18 and 13, via a series network including resistor $R_2$ and a switch SW. Switch SW is alternately open and closed in accordance with the modulation index M as commanded from line 2 via line 8. The operation of the circuit of FIG. 3 can be explained from a consideration of the curves of FIGS. 4 and 5.

Figure 4:
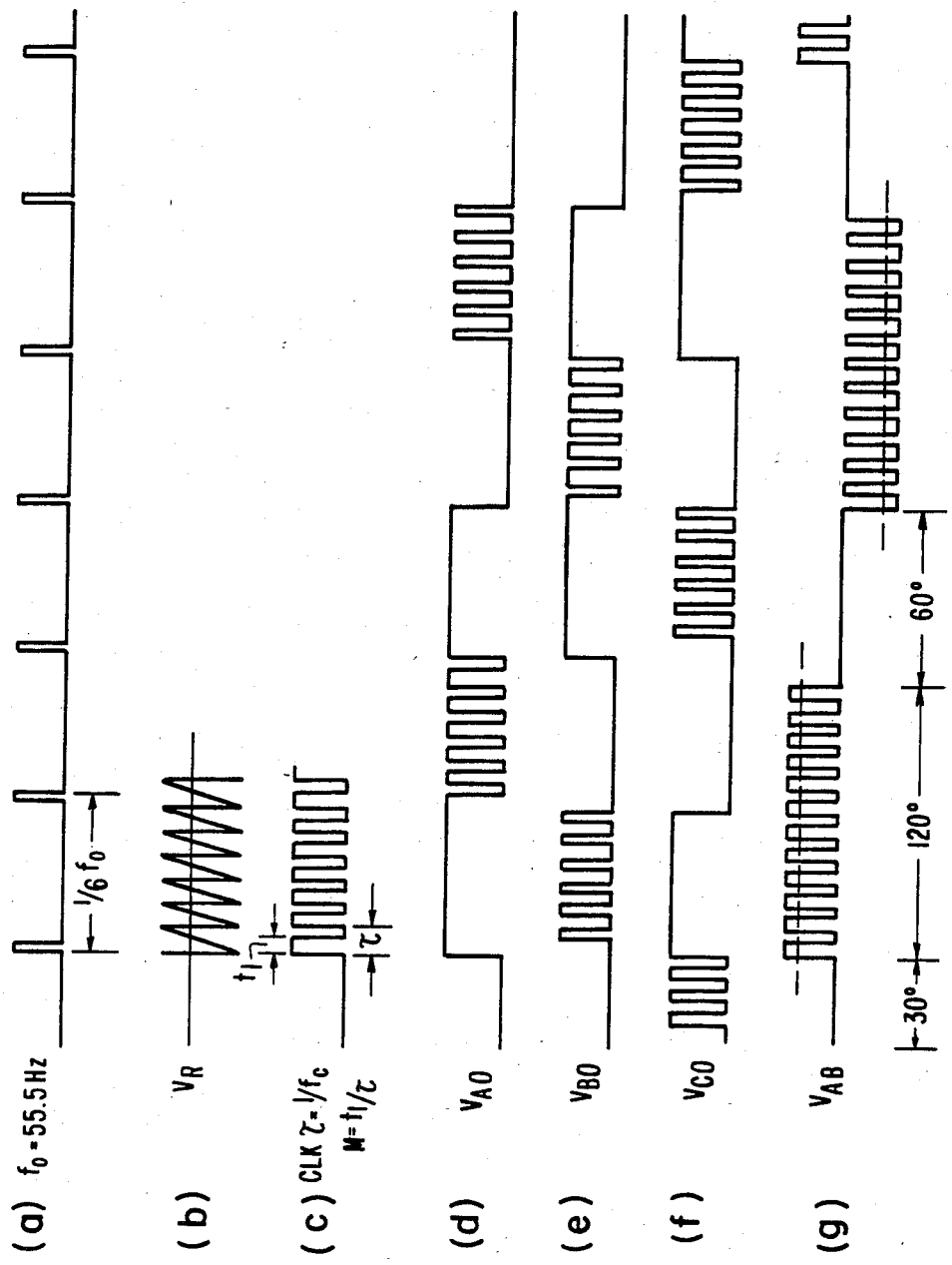
FIG. 4 is a chart of curves illustrating pulse-width modulation and output of a PWM voltage wave at the output of the inverter in the motor drive of FIG. 1.

FIG. 4 shows under (a) a series of pulses generated in the PWM modulator MOD at a repetition rate which is 6 times the frequency of $f_0$ of the motor input currents (A,B,C) assigned from line 1. A ramp generator, generally known, generates a series of ramps shown by curves (b) which have a duty cycle of period $\tau$ defining the pulse rate of modulation. A voltage reference signal $V_R$ defines the threshold of intersection of such ramps as detected by a comparator, also generally known, whereby pulses illustrated by curve (c) are generated having a width, depending upon $V_R$, which determines the active period of conduction of the static switches of inverter INV. The pulses of curves (a) establish three square waves $V_{A0}$, $V_{B0}$, $V_{C0}$ (as generally known) which are at a 120° phase shift to one another (2/6 $f_0 = 120°$). Voltages $V_{A0}$, $V_{B0}$, $V_{C0}$ are representative of the phase-to-DC minus voltages. The pulses of curves (c) create notches in the square waves as shown under (d), (e) and (f) and the resulting fundamental interphase voltage, $V_{AB}$ for instance, is as shown under (g) which leads to a quasi-square wave $V_0$ shown in dotted line. All this is general knowledge. Assuming the width of a pulse under (c) has a duration $t_1$ and the duty cycle has a period $\tau$, the modulation index is $M = t_1/\tau$.

Referring again to FIG. 3 when the operational amplifier is operating, and assuming switch SW is closed, i.e. ignoring the switch for the moment, the voltage on line 13 is maintained equal to the voltage on line 14, which is connected to ground. Accordingly, the voltage $V_1$ in front of resistor $R_1$ causes a current I to traverse the resistor so that $V_1 - R_1 I = 0$ and $I = V_1/R_1$.

The current in $R_2$ is $I_R$ such that $I_R = I$. $I_R = V_1/R_1$ for the same reason that $I = V_1/R_2$ (e.g. zero volt on line 13). Considering now switch SW which is closed during the $t_1$ portions of the cycles, the hereabove currents, $I_R$ and I should be considered as average currents in the respective resistors $R_1$ and $R_2$. The usual notation for such average currents is $\bar{I}_R$, $\bar{I}$ instead of $I_R$ and and I respectively. The average current is $\bar{I}_R = \bar{V}_2/R_2$ when the switch is closed and zero when it is open. For the entire period $\tau$ the average is $$\bar{I}_R = \bar{I} = I = \frac{1}{\tau}\left[ t_1 \frac{\bar{V}_2}{R_2} + (\tau - t_1) \times 0 \right] = \frac{t_1}{\tau} \frac{\bar{V}_2}{R_2} = I$$

However, $t_1/\tau = M$, then $$\bar{V}_2 = IR_2/M$$

where $\bar{V}_2$ is the average voltage when the switch is closed.

Figure 5:
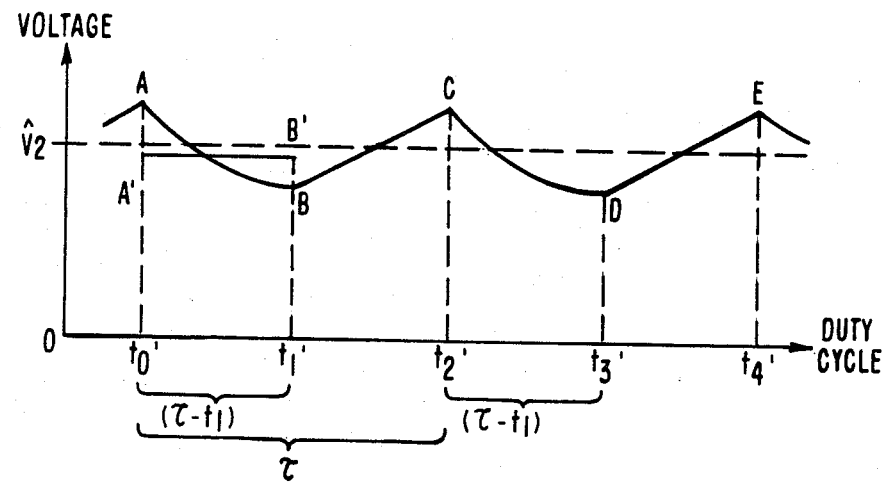
FIG. 5 is a curve explaining the operation of the circuit of FIG. 3.

Referring to FIG. 5, the average voltage $V_2$ is shown from A' to B'. However, the value of interest in ascertaining the torque on line 9 is the average value $\bar{V}_2$ over the entire period. This value is shown in dotted line on FIG. 5. If capacitor C is made large enough, so that the ripple is small compared with the long run average value, the difference in magnitude between A'B' and the dotted line will be minimal. The exponential decay from instant $t_0'$ to instant $t_1'$ (or $t_2'$ to $t_3'$, etc.) can be in good approximation considered as linear since $t_1$ is a small fraction of the time constant $R_2 C$ in the feedback loop of the operational amplifier. With such approximation, for the whole period:

$$V_2 = IR_2/M = V_1 \frac{R_2}{R_1} /M$$

Therefore, it appears that the signal $V_1$ derived between $T_A'$ and $T_B'$ has been successfully divided by the modulation index M, thereby to derive on line 9 a signal proportional to the torque T.

Figure 6:
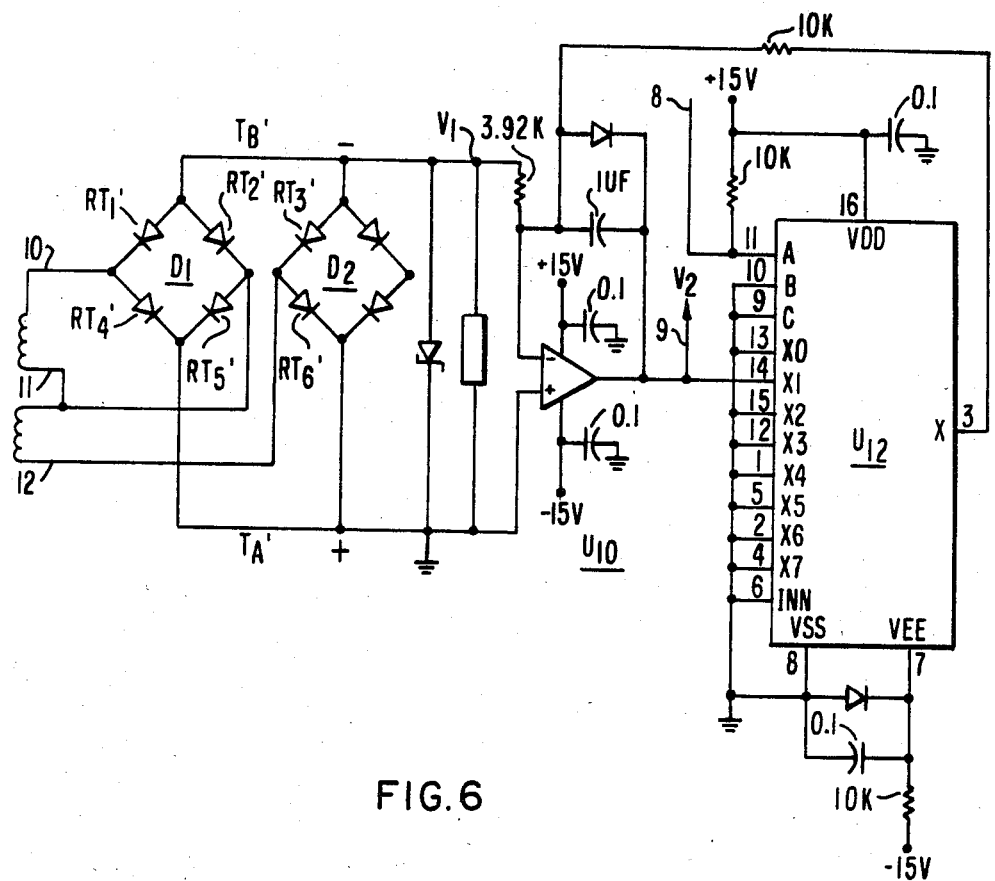
FIG. 6 illustrates one mode of implementation of the circuit of FIG. 3.

Referring to FIG. 6, actual implementation of the torque discriminator TD of FIGS. 1, 2 and 3 is illustratively shown to include an operational amplifier OP (shown as $U_{10}$) of the type sold on the open market as an LF356. $R_1=3.92K$, 1% and 0.125 W; $R_2=10K$, 1% and 0.125 W. Switch SW (shown as $U_{12}$) is an analog multiplexer 4051.

Figure 7:
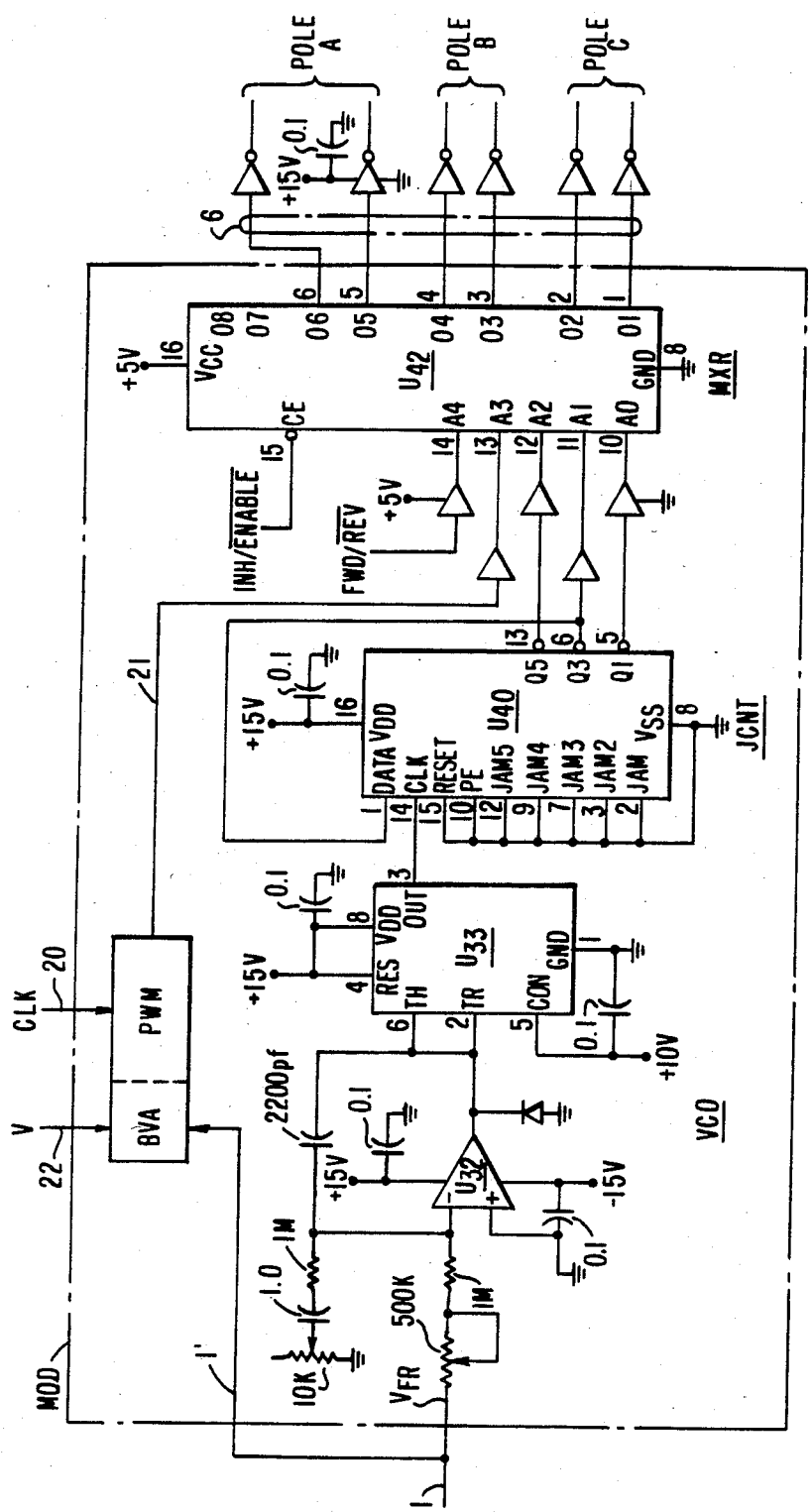
FIG. 7 is an illustration of actual implementation of pulse-width modulation in conjunction with the diagram of FIG. 1.

Referring to FIG. 7 the pulse width modulator includes a voltage controlled oscillator VCO comprising an operational amplifier of the LF356 type associated with a 555 timer ($U_{33}$) for the generation of the pulses under (1) on FIG. 4. These pulses are inputted in the clock pin of a Johnson counter ($U_{40}$) of the 4018 type, to output the square waves under (d) (e) (f) in FIG. 4.

The $Q_5$, $Q_3$, $Q_1$ pins outputs of the Johnson counter are inputted into the $A_2$, $A_1$, $A_0$ pins of mixer which is a PROM sold as IM 5610. The second most significant digit on pin $A_3$ is provided from line 21, which is the output line of the pulse width modulator proper generating the signal under (c) in FIG. 4. The most significant digit on pin $A_4$ is reserved for the forward and reverse command signals. The six outputs (06–01) on lines 30–35 are those corresponding to lines 3,4, 5 (paired for polarities) of FIG. 1 and applied to the drivers of the inverter switches.

Figure 8:
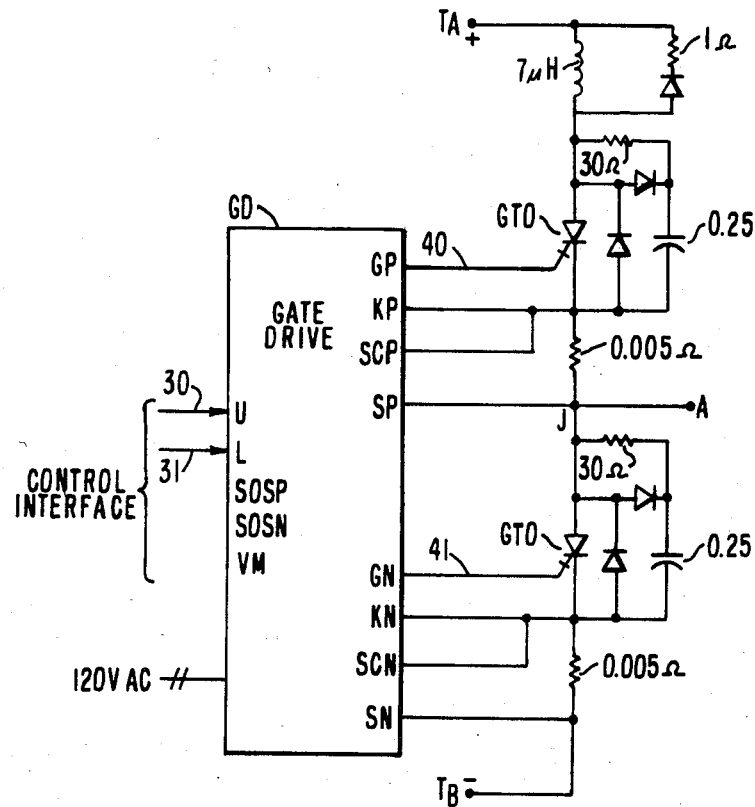
FIG. 8 shows one pole for GTO driving as controlled by the driving signals of FIG. 7.

FIG. 8 shows pole A of FIG. 2, for purpose of illustration. Signals on lines 30 and 31 (for the upper and lower switches, respectively) are the firing signals for a corresponding GTO. Junction J common to the two GTO's in series is connected to motor line A.

Figure 9:
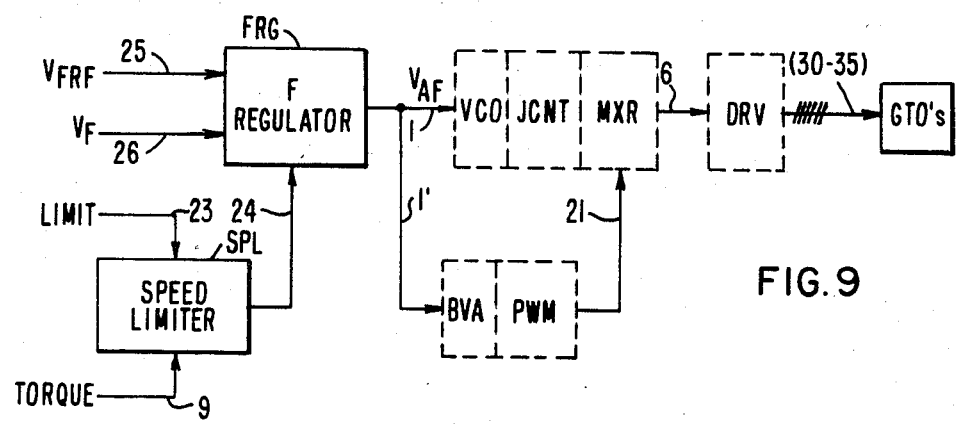
FIG. 9 is a diagrammatic representation of torque-limit control in a PWM motor drive like in FIG. 1.

Referring to FIG. 9, a block diagram illustrates the use of the torque signal, derived according to the invention, to adjust the speed of the motor whenever the torque signal tends to exceed an assigned limit. Frequency regulator FRG responds to the error between the assigned frequency $V_{FPF}$ and actual frequency $V_F$ to provide on line 1 an adjusted frequency command signal $V_{AF}$ which determines (through the VCO, the Johnson counter JCNT and the mixer MXR) the frequency of the waves of line 6. The pulse width-modulator PWM responds to the signal of line 1, via line 1', in providing boost and voltage-to-frequency ratio adjustment section (BVA) before generating the modulation signal of line 21 which modulates the waves of line 6. When the torque signal of line 9 exceeds the limit of line 23, a speed limiter SPL generates a corrective signal on line 24 applied to the frequency regulator FRG to control the speed of the motor accordingly.

In order to illustrate the cost of adding circuitry such as shown in FIGS. 2 and 3 for the determination of the torque, the following components have to be provided:

| Qty. | Item | Unit $ | Total $ |
|---|---|---|---|
| 2 | 9010-204 CT's | 2.24 | 4.48 |
| 6 | 1N645 Diode | 0.02 | 0.12 |
| 3 | 10K ¼ w Resistor | 0.025 | 0.08 |
| 1 | 1 μF 100 V Mylar Cap | 0.36 | 0.36 |
| 1 | LF356N Op-Amp | 0.58 | 0.58 |
| 1 | MC14051BCP | 0.36 | 0.36 |
| | | | $5.98 |

In addition to low cost, this circuitry has also the advantage of providing isolation from the power supply ($L_1$, $L_2$, $L_3$).

I claim:

1. In a pulse-width-modulated (PWM) motor drive including an induction motor; an inverter for supplying AC current to said motor; a voltage-source including first rectifier means supplied with an AC power supply; a DC link between said voltage-source and said inverter for applying a direct current $I_{DC}$ to said inverter; and pulse-width-modulation means for controlling said inverter in accordance with pulse-width-modulated time waves of selected frequency and selected modulation index M; the combination of:

current transformer means coupled with said AC power supply for deriving a vectorial representation of the sum of the AC currents supplied to said first rectifier means;

second rectifier means responsive to said current transformer means for generating a voltage signal representative of said AC currents sum vectorial representation;

said voltage signal being representative of said direct current $I_{DC}$;

operational amplifier means responsive to said voltage signal current representative signal; and switch means operative on the gain of said operational amplifier means for repeatedly reducing the gain thereof to a lower value determined by the ON and OFF states of said switch means, the duty cycle thereof being in relation to the modulation index M of said pulse-width-modulation means, whereby said operational amplifier means derives an output signal representing $I_{DC}/M$, said output signal being applied to said motor drive as a torque representative signal.

2. The motor drive of claim 1 with said AC power supply being a three-phase power supply, and said current transformer means being current transformers connected in open-delta.

* * * * *